Patented Oct. 2, 1951

2,569,688

UNITED STATES PATENT OFFICE 2,569,688

PROCESS FOR MAKING CONJUGATED DIENE COPOLYMERS

Harold F. Park, East Longmeadow, Mass., assignor to Monsanto Chemical Company, St. Louis, Mo., a corporation of Delaware No Drawing. Application May 12, 1947, Serial No. 747,593

1 Claim. (Cl. 260—84.3)

This invention relates to the copolymerization of conjugated dienes. More particularly, the invention relates to the preparation of diene-styrene copolymer emulsions.

The emulsion copolymerization of conjugated dienes with aromatic vinyl compounds is an important process in the production of synthetic rubber. The conventional processes have included the steps of copolymerizing the monomeric materials in aqueous emulsion, then coagulating the emulsion and washing the coagulated material to remove emulsifying agent, catalyst, coagulant, etc. The coagulating and washing steps are cumbersome, time consuming and add materially to the cost of preparing the copolymer.

It is an object of this invention to provide a process for the copolymerization of conjugated dienes with aromatic vinyl compounds in aqueous emulsion.

A further object is to provide a process for preparing aqueous emulsions of conjugated diene-aromatic vinyl compound copolymers which may be direct dried.

Still another object is to provide a process for copolymerizing butadiene and styrene in aqueous emulsion such that the emulsion produced may be direct dried without being coagulated and washed.

These and other objects are attained by copolymerizing a conjugated diene with an aromatic vinyl compound in aqueous emulsion, using critical ranges of emulsifying agent, catalyst, pH regulator, modifying agent, etc., as will be more particularly set out.

The following examples are given in illustration and are not intended as limitations on the scope of this invention. Where parts are mentioned, they are parts by weight.

*Example I*

Three solutions are made up separately as follows:

Solution A—
    Water _____Parts__ 1,000
    Sodium salt of Mahogany
      acids _____do____ 0.8
Solution B—
    Isoprene _____do____ 165
    Styrene _____do____ 250
    Dodecyl mercaptan _____do____ 0.34
Solution C—
    Water _____do____ 100
    Potassium persulfate _____do____ 0.8

Place solution A in a suitable glass or glass-lined container and heat it to boiling for about 15 minutes to remove dissolved and occluded air, then cool the solution to about 75° C. under an atmosphere of nitrogen. To this solution add solution B with continuous agitation at such a rate that the reaction temperatures does not drop below 60° C. Add solution C to solution A at the same time and at the same relative rate that solution B is added. After all of the monomer mixture and catalyst have been added, continue to heat the reaction mixture until the reflux temperature rises to approximately 97° C., then cool and add 5 parts of hydroquinone. Maintain an atmosphere of nitrogen in the reaction vessel throughout the reaction. The product is an aqueous emulsion of a copolymer of isoprene and styrene containing dodecyl mercaptan as a modifying agent and hydroquinone as a stabilizer. The emulsion may be dried directly without coagulating it to provide a copolymer having excellent physical properties and relatively low water absorption. The copolymer produced in this fashion may be compounded and fabricated without difficulty.

*Example II*

Dissolve 3 parts of decyl benzene sodium sulfonate in 2000 parts of distilled water and boil the solution for about 15 minutes to remove dissolved and occluded air, then cool the solution to about 45° C. under an atmosphere of nitrogen and add 3 parts of potassium persulfate. To this solution add continuously over a 20-hour period with constant agitation a mixture of 680 parts of freshly distilled butadiene, 320 parts of freshly distilled styrene and 0.8 part of diisopropyl xanthic disulfide while maintaining the temperature at approximately 45° C. The reaction is carried out in an autoclave or other pressure resistant vessel. After all the monomer mixture has been added, add 20 parts of phenyl beta naphthylamine. The product is a stable emulsion of butadiene-styrene copolymer which may be dried directly without being coagulated. The dried copolymer has relatively low water sensitivity, good age resistance and excellent physical properties. It may be compounded and fabricated by the conventional methods for treating natural or synthetic rubber.

Prior processes for the preparation of copolymers of conjugated dienes and aromatic vinyl compounds in aqueous emulsion have required large amounts of emulsifying agents and catalyst which, if left in the synthetic rubber, are extremely detrimental to the physical properties and age resistance thereof. It has now been found that extremely small quantities of emulsifying agent and catalyst may be used and subsequently allowed to remain in the synthetic rubber produced, providing certain conditions are maintained.

In the first place, the emulsifying agent must be one of the so-called ionic compounds which is capable of spontaneous separation into two electrically charged portions, one of which is solvated to a greater extent by the dispersed phase of the emulsion than the other so that the dispersed particles will acquire an electrical charge and thus repel one another to form a stable emulsion.

The emulsifying agent must also be surface-active enough to minimize the surface-energy change resulting from change in interfacial surface area. Emulsifying agents which regulate the interfacial tension between 0 and 20 dynes per centimeter meet this requirement.

The emulsifying agent must be so solvated by the continuous phase that the amount of emulsifying agent absorbed at the dineric interface will buffer the impact of colliding particles and thus decrease the coalescence tendency. It must also structuralize the continuous phase so that cybotaxis will reduce to a minimum the tendency of this phase to disperse. The emulsifying agent must also increase the viscosity of the external phase in order to diminish the magnitude and velocity of kinetic and agitational movement.

The following emulsifying agents will meet the above stated conditions provided that they are used in an amount within the range of 0.5 to 1.0 parts per 100 parts of monomer mixture and provided that other critical conditions pertaining to catalyst, pH regulator, polyvalent ion, agitation, and ebullition as set forth below are met: soaps including alkali metal salts of long chain fatty acids such as lauric acid, palmitic acid, stearic acid, oleic acid, coconut oil fatty acids, polyacrylic acids, polymerized alpha alkyl acrylic acids, styrene-maleic anhydride copolymers, etc.; quaternary ammonium salts including diethyl amino ethylol ethyl amine hydroacetate, cetyl dimethyl benzyl ammonium chloride, mono amino meta diphenyl benzene stearate, etc.; ammonium or alkali metal salts of sulfonated organic compounds including sodium salts of alkylated aryl sulfonates, such as dibutyl phenyl phenol sodium disulfonate, monobutyl phenyl phenol sodium monosulfonate, monoethyl phenyl phenol potassium monosulfonate, sodium salts of alkyl naphthalene sulfonic acids, isobutyl naphthalene sodium sulfonate, isopropyl naphthalene sodium sulfonate, sodium salts of sulfonated hydrocarbons, sodium salts of alkyl polyether sulfonates, sodium salts of sulfonated lignin, sodium tetrahydronaphthalene sulfonate, etc. In place of the sodium salts, ammonium salts or salts of other alkali metals such as lithium, potassium, rubidium, and cesium may be used. A mixture of emulsifying agents may be used providing that they are taken from the same class.

As a further means for maintaining the critical features of the emulsifying agents at optimum efficiency, a compound which operates to regulate the pH of the emulsion may be used in the proportions from about .003 to about 0.5 part per 100 parts of monomer mixture. For such emulsifying agents as the alkali salts of sulfonated organic compounds or the quaternary ammonium salts, the pH of the emulsion should be regulated to from about 4.5 to about 6.5. Examples of compounds which operate to maintain a pH of from 4.5 to 6.5 are sodium bicarbonate, disodium hydrogen phosphate, sodium acetate, sodium citrate, potassium formate, etc. In the event that soaps are used as emulsifying agents, the pH of the emulsion may be regulated between about 8 and about 11, using such alkaline materials as hydroxides of alkali metals and alkaline earth metals and quaternary ammonium compounds. The amount of pH regulator used will depend somewhat on the amount and type of catalyst used and especially on the pH of the decomposition products of the catalyst. If hydrogen peroxide is used as a catalyst, the amount of pH regulator may be as small as .002 part per 100 parts of monomer mixture. The amount of pH regulator may also be kept at a minimum if the copolymerization is carried out in the absence of air, e. g., under an atmosphere of carbon dioxide or nitrogen. In many combinations it will not be necessary to use a pH regulator.

Other catalysts than the potassium persulfate shown in the examples may be used, such as sodium perborate, hydrogen peroxide, acetyl peroxide, ammonium persulfate, ceric sulfate, etc. The catalysts must be water-soluble and must have an oxidation reduction potential of less than −1.5. Such well known catalysts as benzoyl peroxide, lauroyl peroxide, di(tertiary butyl) peroxide, etc. are for practical purposes insoluble in water and cannot be used, even though their oxidation reduction potential is less than −1.5, since their use in the present process produces polymers greatly inferior to those made with the preferrerd catalysts. The amount of catalyst used may be varied between about .005 to about 0.4 part per 100 parts of monomer mixture. Use of water-insoluble catalysts or catalysts having an oxidation reduction potential of more than −1.5 or use of the preferred catalysts in amounts outside of the critical range will destroy the conditions which make it possible to use the emulsifying agents according to the process of this invention.

Another condition which must be met before emulsions which may be direct dried can be made is the relative absence of polyvalent ions. If the emulsifying agent belongs to the class known as anion-active, the concentration of polyvalent cations such as aluminum, chromium, ferric, ferrous, calcium, barium, strontium, magnesium, zinc, etc. ions must be less than 100 P. P. M. If the emulsifying agent is cation-active, the concentration of polyvalent anions must also be kept below 100 P. P. M. In addition, other materials capable of destroying active centers must not be present in a concentration exceeding 0.01 molar based on total monomer. Examples of such impurities are molecular oxygen, iodine, sulfur, bromine, selenium, phenols, quinones, amines, etc.

In order to successfully produce emulsions with the emulsifying agents and proportions shown above, the system should be subjected to mechanical agitation slightly in excess of that required to provide the increase in surface energy necessary to effect dispersion of the discontinuous phase to an average particle size of between about 0.05 and 0.5 microns. However, care must be taken to prevent sufficient agitation to cause surface turbulence. Furthermore, vigorous ebullition must be avoided since it increases agitation above permissible limits and also since the formation of bubbles of vapor creates a gas-liquid interface which will absorb a portion of the surface-active emulsifier which portion then becomes unavailable to the monomer and stable emulsions cannot be obtained.

If desired, a modifying agent such as the dodecyl mercaptan shown in Example I or the diisopropyl xanthic disulfide shown in Example II may be used. In place of the compounds already shown, various other sulfur-containing organic compounds may be used, including mercaptans, thiols, organic sulfides, thio and dithioic acids and their derivatives, xanthogenic acids and their derivatives, thiocarbamic acids and their derivatives, etc. Mixtures of two or more of these modifiers may be used. The amount of modifying agent may vary between about .025 to about .35 part per 100 parts of monomer.

The dienes which may be used to form the copolymers of this invention are conjugated dienes such as butadiene, isoprene, chloroprene, cyclopentadiene, dimethyl butadiene, etc. A combination of two or more of the dienes may be used.

The styrene of the examples may be replaced in whole or in part by other polymerizable monovinyl aromatic hydrocarbons and their ring-substituted or side chain-substituted derivatives such as ring-substituted styrenes including mono or polychlor styrenes, mono and poly alkyl styrenes, etc.; side chain-substituted alkyl styrenes including alpha methyl styrene; vinyl diphenyl, etc. The ratio on a weight for weight basis of diene monomer to polymerizable aromatic vinyl compounds may be varied from 1:10 to 10:1. The preferred range is from 1:5 to 5:1.

In making the emulsions, the ratio of monomer mixture to water may be varied from about 1:10 to about 1:1. This ratio is not critical but for ease in recovering the copolymer and other economic reasons, the ratio of one part of monomer mixture to about two parts of water is preferred. In making the emulsions, all of the ingredients may be mixed together at the same time, followed by polymerization, or they may be separated into a plurality of portions which are then mixed over an extended period of time. A preferable procedure is to add all of the emulsifying agent to the greater proportion of the water and then add a monomer mixture plus a modifier, if desired, to the heated solution of emulsifying agent at a rate slow enough to permit easy control of the temperature of the reaction. The catalyst, dissolved in water, may be added continuously or at intervals during the addition of the monomer mixture, providing that a portion of the catalyst must be added at the same time as or prior to the first addition of the monomer mixture.

The temperature of the reaction may be carried out at the reflux temperature or at temperatures from 30 to 40° C. below reflux temperature. If a gaseous monomer such as butadiene is used, the reaction must be carried out in a pressure vessel such as an autoclave. The pressure present within the autoclave will depend on the temperature of the polymerization and no external pressure need be applied. It is advantageous to exclude air from the reaction vessel. This may be accomplished by the use of inert gases such as nitrogen, carbon dioxide, etc. or by boiling the volatile diene monomers until the air above the reaction has been supplanted by vapors of the volatile diene.

The process of this invention is particularly advantageous since it makes possible the emulsion copolymerization of dienes with aromatic vinyl compounds to produce synthetic rubber latexes from which the synthetic rubber may be easily and quickly obtained by direct drying methods such as drum drying, oven drying, etc. The process makes it unnecessary to use large amounts of emulsifying agents; it makes it unnecessary to coagulate the emulsion since it leaves substantially no undesirable impurities in the synthetic rubber which must be washed out before the rubber can be further processed.

It is obvious that many variations may be made in the process and products of this invention without departing from the spirit and scope thereof as defined in the appended claim.

What is claimed is:

A process for copolymerizing styrene with isoprene which consists of dissolving 0.8 part of the sodium salt of mahogany acids in 1000 parts of water, heating said solution to boiling temperature for 15 minutes and then cooling said solution to 75° C. under an atmosphere of nitrogen, adding to the cooled solution a mixture of 250 parts of styrene, 165 parts of isoprene and 0.34 part of dodecyl mercaptan, said addition being made continuously over an extended period of time at temperatures between 60° C. and 75° C. accompanied by constant agitation, and, at the same time, continuously adding a solution of 0.8 part of potassium persulfate dissolved in 100 parts of water and thereafter heating the emulsion at reflux temperature until said reflux temperature rises to 97° C. and finally cooling said solution.

HAROLD F. PARK.

REFERENCES CITED

The following references are of record in the file of this patent:

UNITED STATES PATENTS

| Number | Name | Date |
|---|---|---|
| 2,234,204 | Starkweather et al. | Mar. 11, 1941 |
| 2,333,403 | Youker | Nov. 2, 1943 |
| 2,375,140 | Semon | May 1, 1945 |
| 2,376,337 | Browning, Jr. | May 22, 1945 |
| 2,409,915 | Vanderbilt | Oct. 22, 1946 |
| 2,416,440 | Fryling | Feb. 25, 1947 |
| 2,473,390 | Rose et al. | June 14, 1949 |